US007013767B1

(12) United States Patent
Seim

(10) Patent No.: US 7,013,767 B1
(45) Date of Patent: Mar. 21, 2006

(54) SCREWDRIVER/SCREW UNIT

(76) Inventor: Shannon R. Seim, 8014 Southford Pl., Chesterfield, VA (US) 23832

( * ) Notice: Subject to any disclaimer, the term of this patent is extended or adjusted under 35 U.S.C. 154(b) by 39 days.

(21) Appl. No.: 10/933,373

(22) Filed: Sep. 3, 2004

(51) Int. Cl.
*B25B 15/00* (2006.01)
*F16B 23/00* (2006.01)

(52) U.S. Cl. .......................................... 81/426; 411/919
(58) Field of Classification Search ................. 81/426, 81/436, 438, 439, 441, 461; 411/378, 402–407, 411/410
See application file for complete search history.

(56) References Cited

U.S. PATENT DOCUMENTS

| 379,200 | A | * | 3/1888 | Hanlon | 411/407 |
|---|---|---|---|---|---|
| 1,088,046 | A | * | 2/1914 | Turner | 411/403 |
| 3,178,988 | A | | 4/1965 | Borup | |
| 3,286,749 | A | | 11/1966 | Learned | |
| 3,331,274 | A | * | 7/1967 | Walton | 411/403 |
| 4,037,514 | A | * | 7/1977 | Lliteras | 411/403 |
| 4,325,153 | A | | 4/1982 | Finnegan | |
| D307,697 | S | | 5/1990 | Geckle | |
| 5,269,209 | A | | 12/1993 | Baker | |
| 5,303,787 | A | * | 4/1994 | Brady | 175/430 |
| 5,366,330 | A | * | 11/1994 | Cosenza | 411/405 |
| 5,647,712 | A | * | 7/1997 | Demirdogen et al. | 411/404 |
| D407,302 | S | * | 3/1999 | Lawson | D8/387 |
| 5,957,645 | A | * | 9/1999 | Stacy | 411/404 |
| 6,202,512 | B1 | | 3/2001 | O'Brien et al. | |
| D456,235 | S | | 4/2002 | Song | |
| 2005/0232722 | A1 | * | 10/2005 | Dilling | 411/403 |

* cited by examiner

*Primary Examiner*—David B. Thomas
*Assistant Examiner*—Robert Scruggs
(74) *Attorney, Agent, or Firm*—Donald R. Schoonover

(57) ABSTRACT

A screwdriver element includes two bits, each with a sinuous distal tip end and a screw element includes a head having an X-shaped slot that has sinuous side walls. The bit distal tips have a left-handed shape and a right-handed shape and the side walls of the screw element head are curved in a corresponding manner whereby twisting the screwdriver after the tip is engaged with the screw head slot will cause the screw driver tip to be drawn into tight engagement with the screw head.

1 Claim, 1 Drawing Sheet

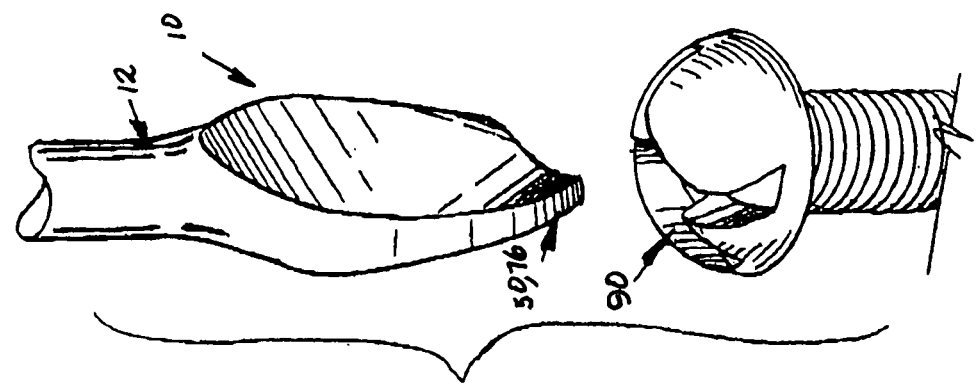
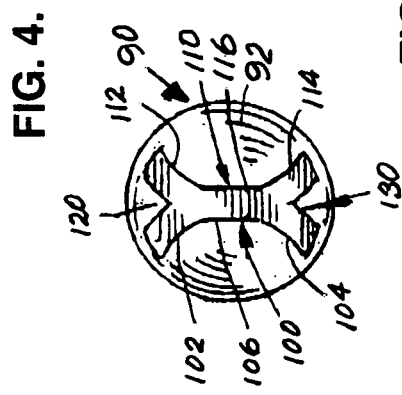
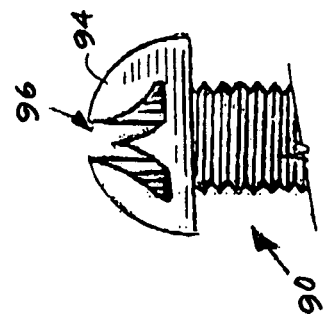
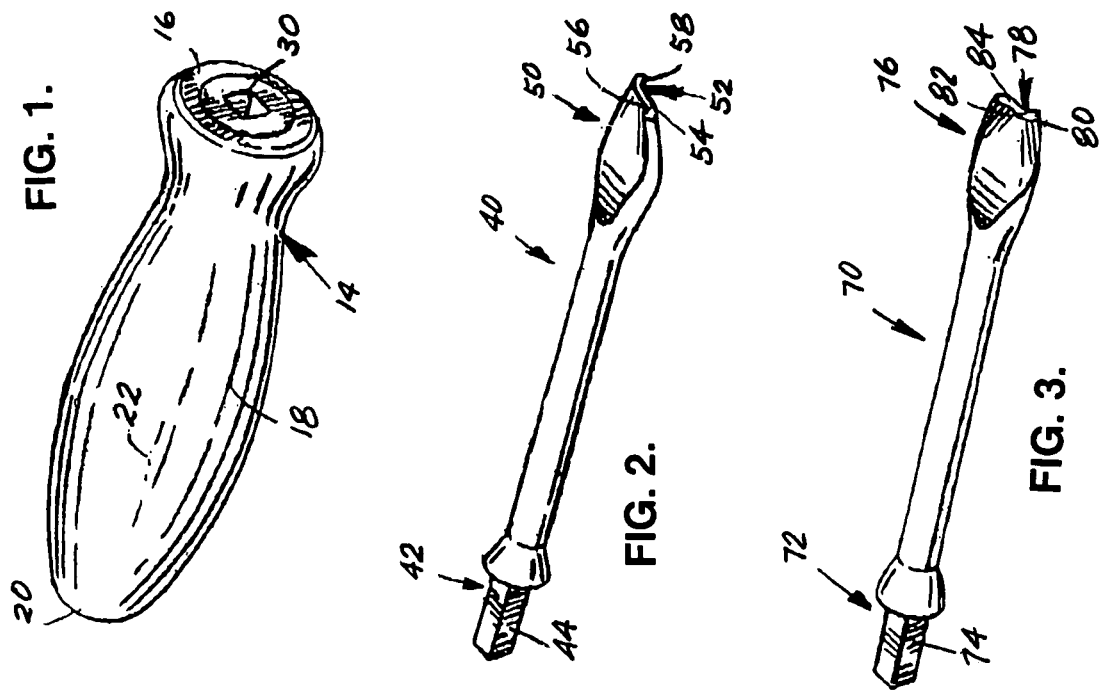

SCREWDRIVER/SCREW UNIT

BACKGROUND OF THE INVENTION

1. Field of the Invention

The present invention relates to the general art of tools, and to the particular field of tools having work-engaging force-exerting portions inserted into a cavity.

2. Discussion of the Related Art

Screws are an integral part of most building elements. Assembling many items requires tightening a screw into place. This is generally accomplished using a screwdriver of some sort.

Most craftsmen and, indeed, most people, who have worked at the task of tightening a screw into place, have had the unpleasant experience of having the screw driver slip off of the screw. When this occurs, the screw head may be damaged, or the area adjacent to the screw may be damaged, and the worker may be hurt. None of these results are desirable.

The art contains several examples of screws that are designed to avoid the just-discussed slipping problem. The Phillips head screw is one example of such a screw.

However, even the Phillips head screw requires effort from the worker to keep the screw driver tip engaged in the slots of the screw. Such effort degrades the effort used to turn the screw. This may be important in cases, such as when the screw is rusted or otherwise attached to a substrate.

Therefore, there is a need for a system that will keep a screwdriver tip engaged with a screw head.

However, even more than simply keeping a screwdriver tip engaged with the screw head, it would be very helpful if there were some means for actually assisting a worker in keeping the screwdriver tip engaged with the screw head. The worker could then focus his or her entire concentration on rotating the screw as required.

Therefore, there is a need for a system that will assist a worker in engaging a screwdriver tip with a screw head.

Since screws must be forced into place and backed out of place, the above-described difficulties can occur during both operations.

Therefore, there is a need for a system that will assist a worker in engaging a screwdriver tip with a screw head during both the setting and removing of a screw.

PRINCIPAL OBJECTS OF THE INVENTION

It is a main object of the present invention to provide a system that will keep a screwdriver tip engaged with a screw head.

It is another object of the present invention to provide a system that will assist a worker in engaging a screwdriver tip with a screw head.

It is another object of the present invention to provide a system that will assist a worker in engaging a screwdriver tip with a screw head during both the setting and removing of a screw.

SUMMARY OF THE INVENTION

These, and other, objects are achieved by a screwdriver/screw unit that includes a screwdriver having two bits, each of which includes a sinuous tip distal end with one curve being associated with a right-hand screw rotation and the other curve being associated with a left-hand screw rotation. A screw head includes an X-shaped slot having curved sidewalls. The sidewalls are curved to accommodate the curved tip distal ends. When the tip distal ends are accommodated in the slot of the screw, rotation of the screwdriver will force the curved tip against the curved wall of the screw slot. The corresponding curves will cause the screwdriver tip to be engaged with the screw head slot wall. One tip is used to drive the screw forward, and one tip is used to back the screw out.

Using the screwdriver/screw unit embodying the present invention will permit a worker to focus all of his attention and energy into rotating the screwdriver and none of his attention will have to be used in keeping the screwdriver engaged with the screw. The unit embodying the present invention automatically engages the screwdriver tip with the screw head, and this engagement increases as torque on the screwdriver is increased. Thus, when a greater force is required to move a screw, this increased force will assist in keeping the screwdriver engaged with the screw head. With many prior art screwdrivers, the increased force may create a situation where the likelihood of the screwdriver slipping off of the screw is increased. The two bits and screw head X-shaped curve will permit the unit embodying the present invention to be used to move a screw forward or backward with the same advantages.

BRIEF DESCRIPTION OF THE DRAWING FIGURES

FIG. 1 is a perspective view of a handle of a screwdriver/screw unit embodying the present invention.

FIG. 2 is a perspective view of a right-handed bit of the screwdriver/screw unit embodying the present invention.

FIG. 3 is a perspective view of a left-handed bit of the screwdriver/screw unit embodying the present invention.

FIG. 4 is a top plan view of screw head of the screwdriver/screw unit embodying the present invention.

FIG. 5 is a side view of screw head of the screwdriver/screw unit embodying the present invention.

FIG. 6 is a perspective view of a screwdriver tip and a screw head of the screwdriver/screw unit embodying the present invention.

DETAILED DESCRIPTION OF THE PREFERRED EMBODIMENT

Other objects, features and advantages of the invention will become apparent from a consideration of the following detailed description and the accompanying drawings.

Referring to the Figures, it can be understood that the present invention is embodied in a screwdriver/screw unit 10 that fulfills the above-stated objectives and overcomes the disadvantages of the prior art.

Screwdriver/screw unit 10 comprises a screwdriver 12 which includes a handle element 14 having first face 16 that is a working face when screwdriver 12 is in use, a side wall 18 which is contacted by a worker when screwdriver 12 is in use, a second end 20, and a longitudinal axis 22 which extends between first face 16 and second end 20.

A bit-accommodating bore 30 is defined in handle element 14 to extend from first face 16 toward second end 20 in the direction of longitudinal axis 22. Bit-accommodating bore 30 is known and thus will not be further discussed in detail.

A first bit element 40 includes a first end 42, which is a proximal end when first bit element 40 is in use, and a projection 44 on first end 42. Projection 44 is sized and shaped to be releasably accommodated in bit-accommodating bore 30 in a known manner to releasably, but securely, attach the first bit element 40 to the handle element 14 for use.

A tip end 50 includes a distal end 52 when first bit element 40 is in use. Tip distal end 52 includes a sinuous curved portion 54 which curves in two directions 56 and 58, with a plane containing distal end 52 being oriented perpendicular to a plane containing longitudinal axis 22 when first bit element 40 is attached to handle element 14.

A second bit element 70 includes a first end 72, which is a proximal end when second bit element 70 is in use, and a projection 74 on first end 72. Projection 74 is sized and shaped to be releasably accommodated in bit-accommodating bore 30.

Second bit element 70 further includes a tip end 76 which includes a distal end 78 when second bit element 70 is in use. Tip distal end 78 includes a sinuous curved portion 80 which curves in two directions 82 and 84. A plane containing distal end 78 is oriented perpendicular to a plane containing longitudinal axis 22 when second bit element 70 is attached to handle element 14. Curves 82 and 84 of sinuous curved portion 80 are opposite to curves 56 and 58 of sinuous curved portion 54 of first bit element 40.

The opposite curvature of the sinuous curved portions 54 and 80 permit the screwdriver 12 to be used to advance a screw and to withdraw a screw as will be understood from the following description.

A screw element 90 includes a screw head 92 having a first end 94 that is a top end when screw element 90 is in place and an X-shaped slot 96 which is defined in first end 94.

X-shaped slot 96 includes a first curved wall 100 which is shaped in the form of a "C" and has a first arcuate section 102, a second arcuate section 104, and an elongate section 106 connecting first arcuate section 102 to second arcuate section 104.

X-shaped slot 96 further includes a second curved wall 110 adjacent to first curved wall 100 and which is shaped in the form of a "C" having a first arcuate section 112, a second arcuate section 114, and an elongate section 116 connecting first arcuate section 112 to second arcuate section 114.

As can be understood from FIG. 4, the curves of first arcuate section 102 and second arcuate section 114 are opposite to each other and complementary to curves 56 and 58 of sinuous curved portion 52 of first bit element 40 whereby the sinuous curved portion 52 of first bit element 40 snugly engages first arcuate section 102 and second arcuate section 114 of the second curved wall portion 110 when screwdriver 12 is engaged with screw element 90 for driving the screw element 90 in a first direction.

As can also be understood from FIG. 4, the curves of second arcuate section 104 of first curved wall portion 100 and first arcuate section 112 of second curved wall 110 are opposite to each other and complementary to curves 82 and 84 of sinuous curved portion 80 of second bit element 76 whereby sinuous curved portion 80 of second bit element 76 snugly engages second arcuate section 104 of first curved wall portion 100 and first arcuate section 112 of second curved wall portion 110 when screwdriver 12 is engaged with screw element 90 for driving screw element 90 in a second direction with the second direction being opposite to the first direction.

A first dividing wall 120 separates first arcuate section 102 of first curved wall portion 100 from first arcuate section 112 of second curved wall portion 110, and a second dividing wall 130 separates second arcuate section 104 of first curved wall portion 100 from second arcuate section 114 of second curved wall portion 110. The dividing walls 120, 130 act to capture the distal end tip of the bit elements 40, 70 and hold those tips against the curved walls so the screw driver does not slip off the screw element.

The use positions of the screw driver and the screw element are shown in FIG. 6.

Operation of unit 10 can be understood from the teaching of the foregoing disclosure. Therefore, the operation will not be discussed in detail. To drive the screw element in a clockwise direction with respect to centerline 22, the tip of bit element 40 is inserted into the X-shaped slot 96 on the screw element 90 with the curved portions of the bit element abutting the corresponding curved portions of the curved walls of the screw element 90. The screw driver 12 is then rotated in a clockwise direction about longitudinal axis 22. Retrograde movement of screw 90 is achieved by using bit element 70 and rotating the screw driver 12 in a counterclockwise direction with respect to longitudinal axis 22.

It is to be understood that while certain forms of the present invention have been illustrated and described herein, it is not to be limited to the specific forms or arrangements of parts described and shown.

What is needed and desired to be covered by Letters Patent is as follows:

1. A screwdriver/screw unit comprising:
  (a) a screwdriver which includes
    (1) a handle element having first face that is a working face when said screwdriver is in use, a side wall which is contacted by a worker when said screwdriver is in use, a second end, and a longitudinal axis which extends between the first face and the second end, and
    (2) a bit-accommodating bore defined in the handle element to extend from the first face toward the second end in the direction of the longitudinal axis of the handle element;
  (b) a first bit element which includes
    (1) a first end which is a proximal end when said first bit element is in use,
    (2) a projection on the first end of said first bit element, the projection being sized and shaped to be releasably accommodated in the bit-accommodating bore of said screwdriver, and
    (3) a tip end which includes a distal end when said first bit element is in use, the tip distal end of said first bit element including a sinuous curved portion which curves in two directions with a plane containing the distal end of the tip end of said first bit element being oriented perpendicular to a plane containing the longitudinal axis of the handle element of said screwdriver when said first bit element is attached to the handle element;
  (c) a second bit element which includes
    (1) a first end which is a proximal end when said second bit element is in use,
    (2) a projection on the first end of said second bit element, the projection being sized and shaped to be releasably accommodated in the bit-accommodating bore of said screwdriver, and
    (3) a tip end which includes a distal end when said second bit element is in use, the tip distal end of said second bit element including a sinuous curved portion which curves in two directions with a plane containing the distal end of the tip end of said second bit element being oriented perpendicular to a plane containing the longitudinal axis of the handle element of said screwdriver when said second bit element is attached to the handle element, the curves of the sinuous curved portion of said second bit element being opposite to the curves of the sinuous curved portion of said first bit element; and (d) a screw element which includes a screw head having a first end that is a top end when said screw element is in place, and an X-shaped slot defined in the first end of said screw element, the X-shaped slot including
  (1) a first curved wall which is shaped in the form of a C having a first arcuate section, a second arcuate section and an elongate section connecting the first arcuate section to the second arcuate section,
  (2) a second curved wall adjacent to the first curved wall and which is shaped in the form of a C having a first arcuate section, a second arcuate section and an elongate section connecting the first arcuate section of the second curved wall to the second arcuate section of the second curved wall,
  (3) the curves of the first arcuate section of the first curved wall and the second arcuate section of the second curved wall being opposite to each other and complementary to the curves of the sinuous curved portion of said first bit element whereby the sinuous curved portion of said first bit element snugly engage the first arcuate section of the first curved wall portion and the second arcuate section of the second curved wall portion when said screwdriver is engaged with said screw element for driving said screw element in a first direction,
  (4) the curves of the second arcuate section of the first curved wall portion and the first arcuate section of the second curved wall being opposite to each other and complementary to the curves of the sinuous curved portion of said second bit element whereby the sinuous curved portion of said second bit element snugly engage the second arcuate section of the first curved wall portion and the first arcuate section of the second curved wall portion when said screwdriver is engaged with said screw element for driving said screw element in a second direction with the second direction being opposite to the first direction,
  (5) a first dividing wall separating the first arcuate section of the first curved wall portion from the first arcuate section of the second curved wall portion, and
  (6) a second dividing wall separating the second arcuate section of the first curved wall portion from the second arcuate section of the second curved wall portion.

* * * * *